(12) United States Patent
Lee et al.

(10) Patent No.: US 7,869,197 B2
(45) Date of Patent: Jan. 11, 2011

(54) DISPLAY APPARATUS

(75) Inventors: You-sub Lee, Gunpo-si (KR); Hyun-jun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 11/953,464

(22) Filed: Dec. 10, 2007

(65) Prior Publication Data

US 2008/0238273 A1 Oct. 2, 2008

(30) Foreign Application Priority Data

Mar. 28, 2007 (KR) ...................... 10-2007-0030493

(51) Int. Cl.
*G06F 1/16* (2006.01)
(52) U.S. Cl. ...................... 361/679.01; 349/58; 362/634
(58) Field of Classification Search ................... 349/58, 349/60; 362/633, 634; 361/679.05, 679.06, 361/679.21, 679.27, 679.29
See application file for complete search history.

(56) References Cited

U.S. PATENT DOCUMENTS

2006/0274224 A1* 12/2006 Jeong ........................... 349/58
2008/0129921 A1* 6/2008 Huang et al. .................. 349/60

FOREIGN PATENT DOCUMENTS

| JP | 2001-100650 | * | 4/2001 |
| KR | 10-2004-0072798 A | | 8/2004 |
| KR | 10-2005-0073508 A | | 7/2005 |
| KR | 10-2006-0008732 A | | 1/2006 |

* cited by examiner

*Primary Examiner*—Hung V Duong
(74) *Attorney, Agent, or Firm*—Sughrue Mion, PLLC (57) ABSTRACT

A display apparatus includes a front casing which includes a front casing body which is formed with a display opening; and a display panel module combined with the front casing, and including a panel body, a frame which is formed on a peripheral area of the panel body and supports the panel body, and a panel supporting member which is formed on the frame and supported to the front casing.

20 Claims, 11 Drawing Sheets

DISPLAY APPARATUS

CROSS-REFERENCE TO RELATED APPLICATIONS

This application claims priority from Korean Patent Application No. 10-2007-0030493, filed on Mar. 28, 2007 in the Korean Intellectual Property Office, the disclosure of which is incorporated herein by reference.

BACKGROUND OF INVENTION

1. Field of Invention

Apparatuses consistent with the present invention relate to a display apparatus, and more particularly, to a display apparatus improved in a combining structure of a casing and a display panel module.

2. Description of the Related Art

A display apparatus includes various kinds of televisions, monitors, etc. forming pictures. A display apparatus such as a flat panel television comprises a display panel module, front and rear casings which accommodate and support the display panel module and form the external appearance.

The display apparatus is assembled by combining the front casing, the display panel module and the rear casing.

However, in the combining process of the front casing and the display panel module, a number of brackets are needed for combining and supporting the display panel module in correspondence to the front casing. According to the related art apparatus, the structure thereof is complicated due to the large number of parts and it is difficult to achieve a light and slim appearance. Thus, manufacturing cost thereof is increased.

SUMMARY OF THE INVENTION

Accordingly, it is an aspect of the present invention to provide a display apparatus which is simplified in a structure thereof and is improved in manufacturing efficiency.

Another aspect of the present invention is to provide a display apparatus which is decreased in the number of parts to thereby reduce manufacturing cost.

Still another aspect of the present invention is to provide a display apparatus which realizes a light and slim appearance and is easily adapted for various sizes of parts.

The foregoing and other aspect of the present invention are achieved by providing a display apparatus comprising a front casing which comprises a front casing body which is formed with a display opening; and a display panel module combined with the front casing, and including a panel body, a frame which is formed on a peripheral area of the panel body and supports the panel body, and a panel supporting member which is formed on the frame and supported to the front casing.

The front casing may comprise a front combining member which is provided to support the display panel module, and the front combining member and the panel supporting member are engaged with each other so that the display panel module can be supported by the front casing.

The display apparatus may further comprise a rear casing forming an accommodating space by being combined with the front casing, and comprise a rear casing body and a rear combining part which is provided to the rear casing body in correspondence to the front combining member.

The rear combining member, the panel supporting member and the rear combining member may be combined by a combining member.

The display apparatus may further comprise an auxiliary combining member which comprises a front skirt which is extended from an edge member of the front casing body and a rear skirt which is extended from an edge member of the rear casing body and combined with the front skirt, wherein an end member of the front skirt is combined with an end member of the rear skirt.

The display panel module may further comprise a first foaming member which is extended backward the frame and a driving unit which is combined with the first foaming member and drives the panel body.

The display panel module may further comprise a driving unit supporting bracket which combines the first foaming member and the driving unit.

The frame may comprise a second foaming member which is spaced from the first foaming member and extended backward thereof, and a wall supporting bracket which is combined to at least one of the second foaming member and the rear casing.

The wall supporting bracket may comprise a rear projection member which is extended toward the accommodating space from a planar surface of the rear casing and a supporting bracket body which is detachably combined to the rear projection member.

The display apparatus may further comprise a direct combining member comprising a front boss member which is provided to the front casing body and a rear boss member which is provided to the rear casing body so as to be combined with the rear casing body.

The front combining member, the panel supporting member and the rear combining member may be combined by a combining member.

The front boss member and the rear boss member may be combined by a fastening member.

The display apparatus may further comprise an auxiliary combining member which comprises a front skirt which is extended from an edge member of the rear casing body and a rear skirt which is extended from an edge member of the rear casing body and combined with the front skirt, wherein an end member of the front skirt and an end member of the rear skirt are combined.

The display panel module may comprise a first foaming member which is extended backward the frame and a driving unit which is combined to the first foaming member and drives the panel body.

The frame may comprise a second foaming member which is spaced from the first foaming member and extended backward the first foaming member, and a wall supporting bracket which is combined to at least one of the first foaming member and the rear casing.

The wall supporting bracket may comprise a rear projection member which is extended toward the accommodating space from a planar surface of the rear casing and a supporting bracket body which is detachably combined to the rear projection member.

The display apparatus may further comprise a stand which supports the front casing, the display panel module and the rear casing.

The display apparatus may further comprise a stand bracket which is provided to be combined with the frame and the stand.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENTS OF THE INVENTION

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Hereinbelow, a display apparatus according to exemplary embodiments of the present invention will be described. The display apparatus may include a television, a monitor or the like, but a planar television will be described by way of example.

A First Exemplary Embodiment

As shown in FIGS. 1 to 6, a display apparatus 100 according to a first exemplary embodiment of the present invention comprises a front casing 110 and a display panel module 130. The display apparatus 100 may further include a rear casing 120. Further, the display apparatus 100 may include an auxiliary combining part 160. Furthermore, the display apparatus 100 may include a wall supporting bracket 170. Moreover, the display apparatus 100 may include a stand 180. The display apparatus 100 may further include a wall bracket 190.

Hereafter, a combining part 150 includes a panel supporting part 151, a front combining part 153 and a rear combining part 155, for the simplicity of the description. The combining part 150 supports and combines the front casing 110, the display panel module 130 and the rear casing 120.

The front casing 110 includes a front casing body 111 which has a display opening 113 formed in the central area thereof. Herein, the front casing body 111 is provided with a planar shape. Alternatively, the front casing body 111 may be provided with various shapes as necessary. Further, the front casing 110 may include the front combining part 153 and a front skirt 161.

The rear casing 120 having a rear casing body 121 is combined with the front casing 110 and forms an accommodating space S. The rear casing 120 may further include a rear combining part 155 and a rear skirt 163. Moreover, the rear casing 120 may include the wall supporting bracket 170.

The front and rear combining parts 153 and 155 and the front and rear skirts 161 and 163 are provided in the front and rear casings 110 and 120. Thus, the number of parts for assembly is reduced and the assembly process is simplified. Accordingly, the manufacturing cost is reduced and a light and compact design can be achieved.

The display panel module 130 is placed in the accommodating space S so that pictures thereof can be displayed through the display opening 113. The display panel module 130 includes a panel body 131 and a frame 133. Further, the display panel module 130 may include a driving unit 141 and a stand bracket 145.

The panel body 131 includes an LCD panel 131a, optical films 131e, 131f and 131g, a light source unit 131h and a reflection plate 131j.

The LCD panel 131a includes a thin film transistor substrate 131b in which a thin film transistor is formed, a color filter substrate 131c facing the thin film transistor substrate 131b, a sealant (not shown) which joins the thin film transistor and color filter substrates 131b and 131c and forms a cell gap, and an LCD layer (not shown) which is placed between the thin film transistor and color filter substrates 131b and 131c and the sealant. On one side of the thin film transistor substrate 131b, an LCD panel driving unit 131d may be provided for applying a driving signal to the LCD panel 131a. The LCD panel driving unit 131d is electrically connected with the driving unit 141.

The optical films 131e, 131f and 131g are placed on the back of the LCD panel 131a and include a protection film 131e, a prism film 131f and a diffusion film 131g.

The protection film 131e is placed on the top thereof and protects the prism film 131f which is easily affected by scratch.

The diffusion film 131g includes a base plate (not shown) and a ball-shaped coating layer which is formed on the base plate. The diffusion film 131g diffuses the light from the light source unit 131h and provides it to the LCD panel 131a. Two or three diffusion films 131g may be layered one another. Here, the diffusion film 131g is not supported by a light guarding plate, and thus, may have a relatively thick thickness for its strength.

The prism film 131f is provided with a plurality of prisms having a triangular section which are aligned on the upper surface thereof with a regular arrangement. The prism film 131f collects the light which is diffused from the diffusion film 131g in a direction perpendicular to the LCD panel 131a. In general, two prism films 131f are used, and micro prisms which are formed on the respective prism films 131f form a predetermined angle. Most lights passed through the prism film 131f go on vertically, to thereby provide a uniform brightness distribution.

The light source unit 131h includes a plurality of lamps (not shown) which are parallel with each other. The lamps are placed over the rear surface of the LCD panel 131a and may have a variety of shapes as necessary. On opposite end parts of the lamps are provided electrode parts (not shown), which are accommodated in a lamp holder (not shown).

A reflection plate 131j is placed in back of the light source unit 131h and reflects the light of the light source unit 131h toward the diffusion film 131g. The reflection plate 131j is made of polyethylene terephthalate (PET) or polycarbonate (PC).

Figure 1:
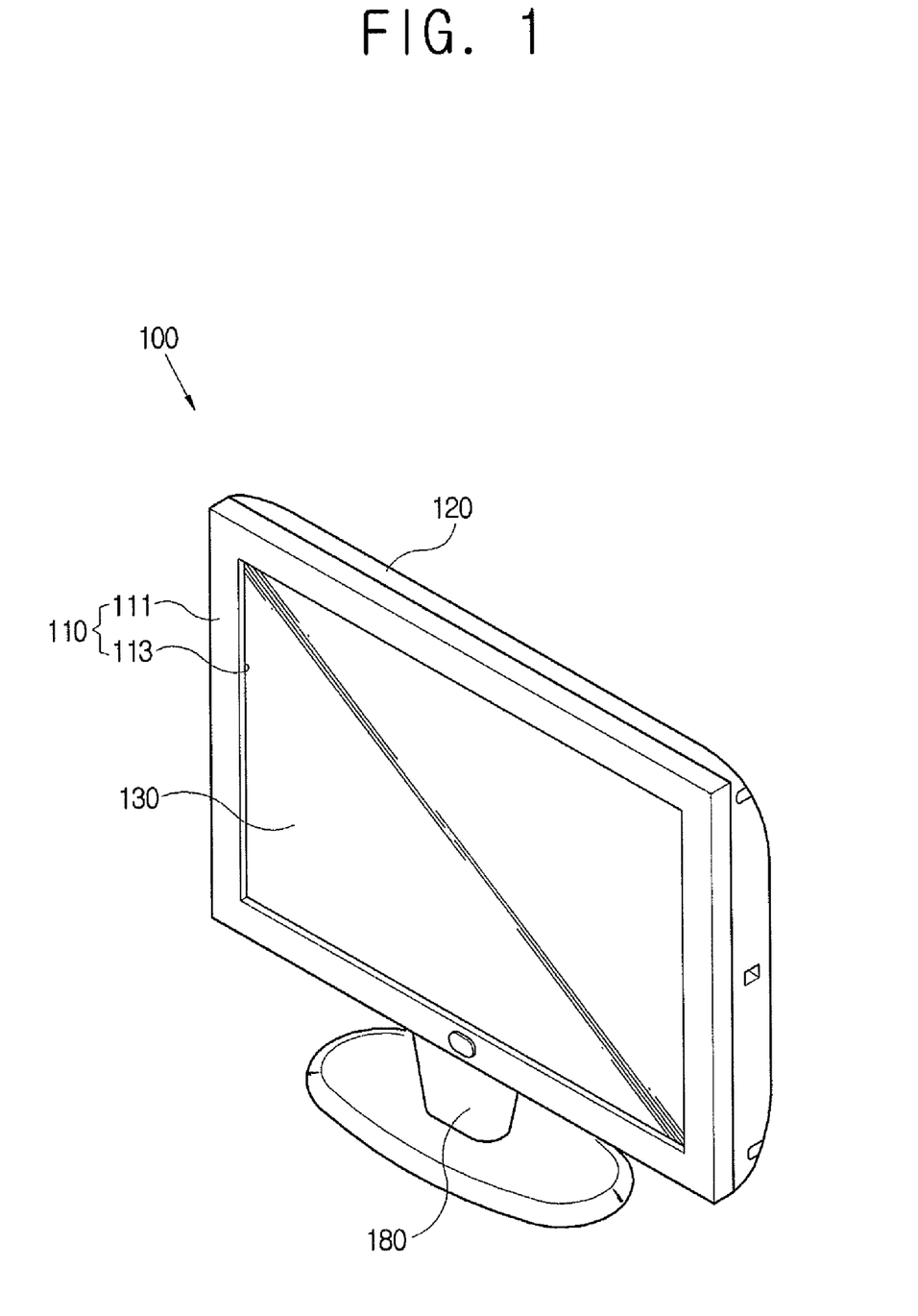
FIG. 1 is a perspective view of a display apparatus according to a first exemplary embodiment of the present invention.
Figure 2:
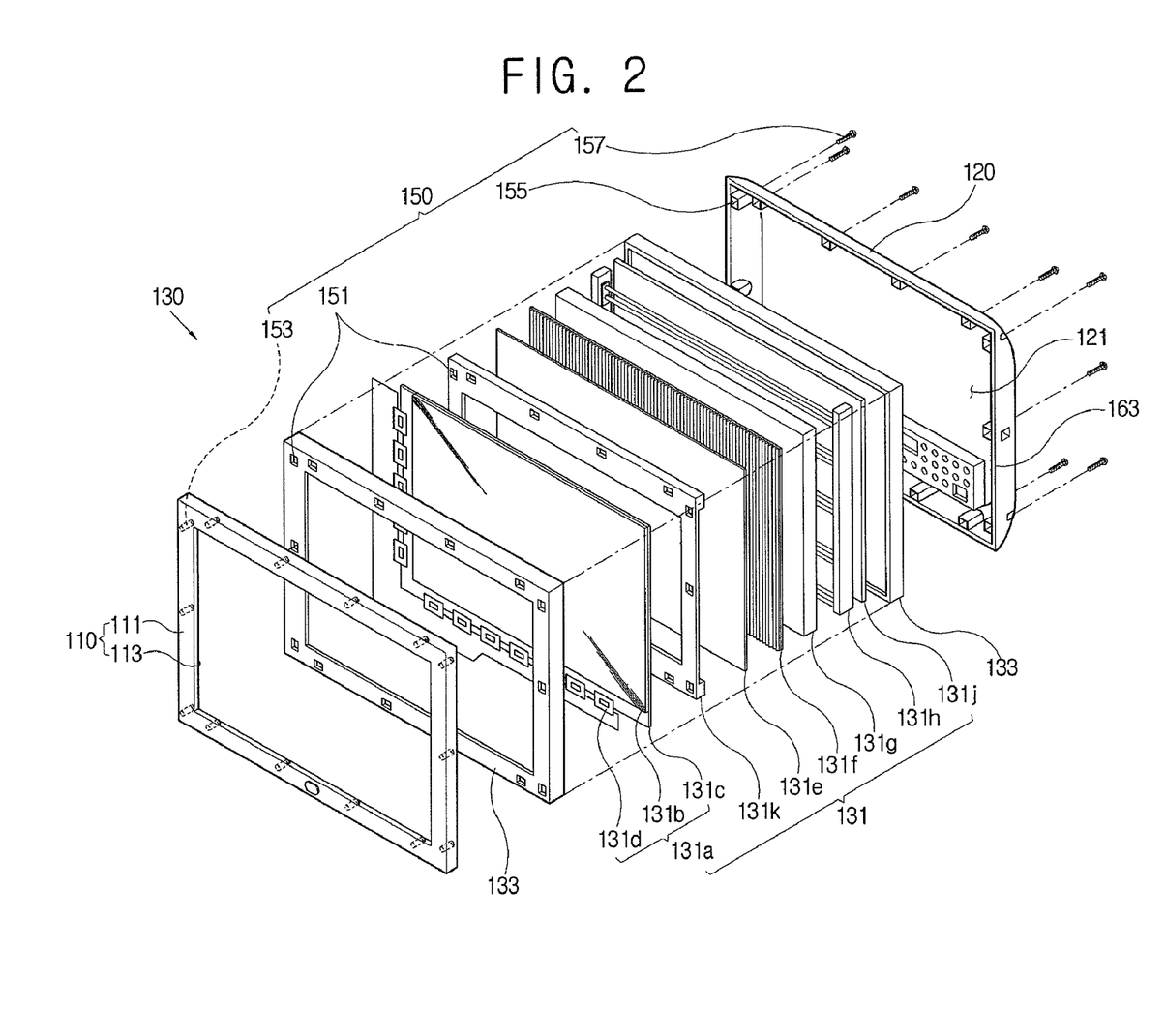
FIG. 2 is an exploded perspective view of the display apparatus in FIG. 1.

In FIG. 2, a reference number 131k refers to a supporting bracket which supports the optical films 131e, 131f and 131g, etc.

The display apparatus 100 according to the first exemplary embodiment of the present invention is not limited to the structure or shape of the panel body 131 as described above, but alternatively, may take various known structures or shapes.

The frame 133 accommodates and supports the panel body 131. The frame 133 is made of steel, and may have a variety of shapes as necessary. The frame 133 may be provided with a plurality of separable frames and may be combined with each other. The frame 133 includes a first foaming part 135 which is extended backward therefrom. The first foaming part 135 has a bracket screw hole 143a which is coupled by a bracket screw 143b. The frame 133 includes a second foaming part 137 which is spaced from the first foaming part 135 and extended backward. The frame 133 may block the electromagnetic waves generated in the panel body 131 and emit heat generated in the panel body 131.

The driving unit 141 includes a power circuit board (not shown) which supplies power to the panel body 131, and a driving circuit unit (not shown) which performs various kinds of functions so as to drive the panel body 131. Further, the driving unit 141 includes various surface mounted elements 142. Moreover, the driving unit 141 needs to vary in its size and the like to meet the various user's demands or increased functions.

Figure 3:
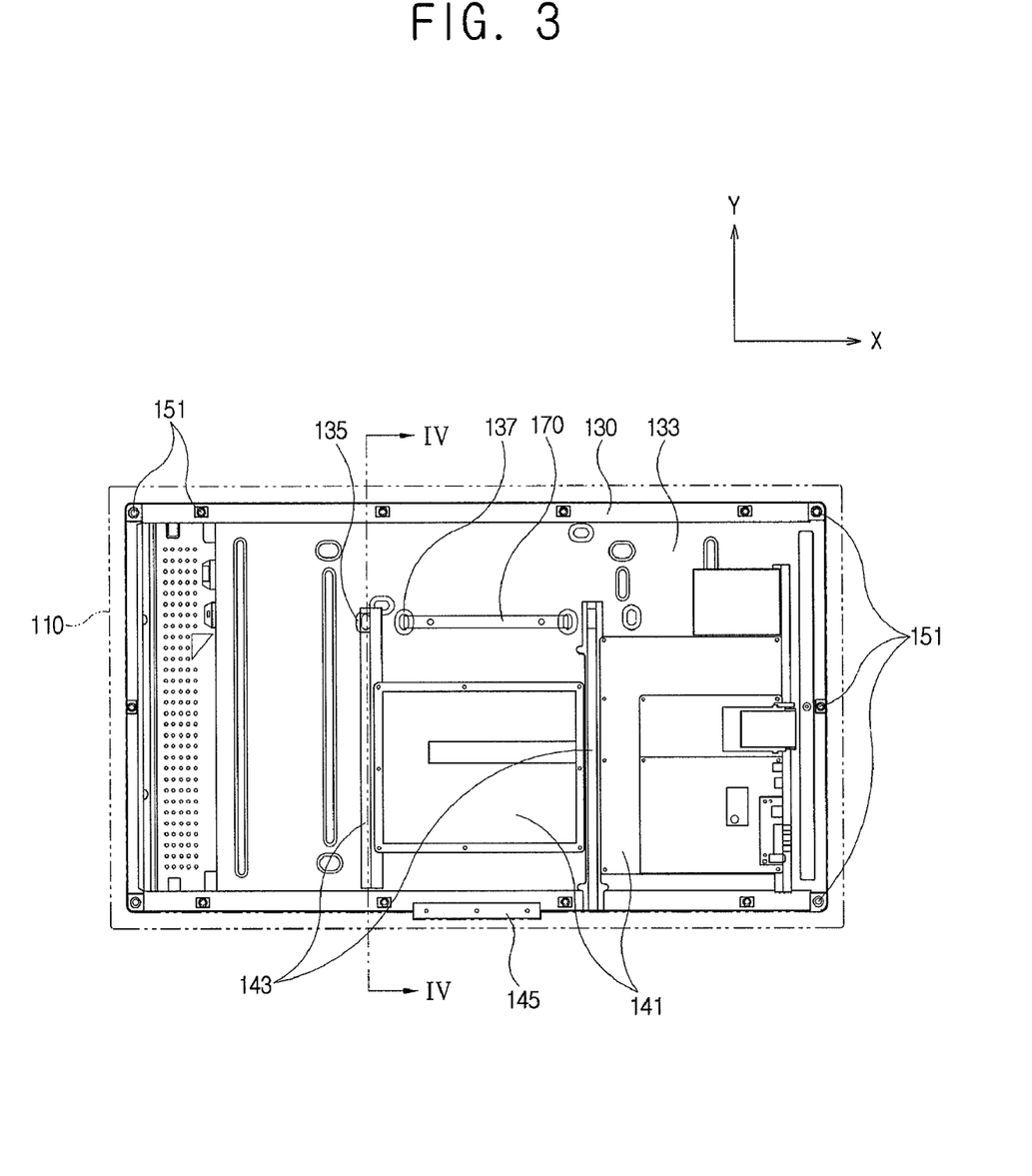
FIG. 3 is a rear view of the display apparatus according to the first exemplary embodiment of the present invention.
Figure 4:
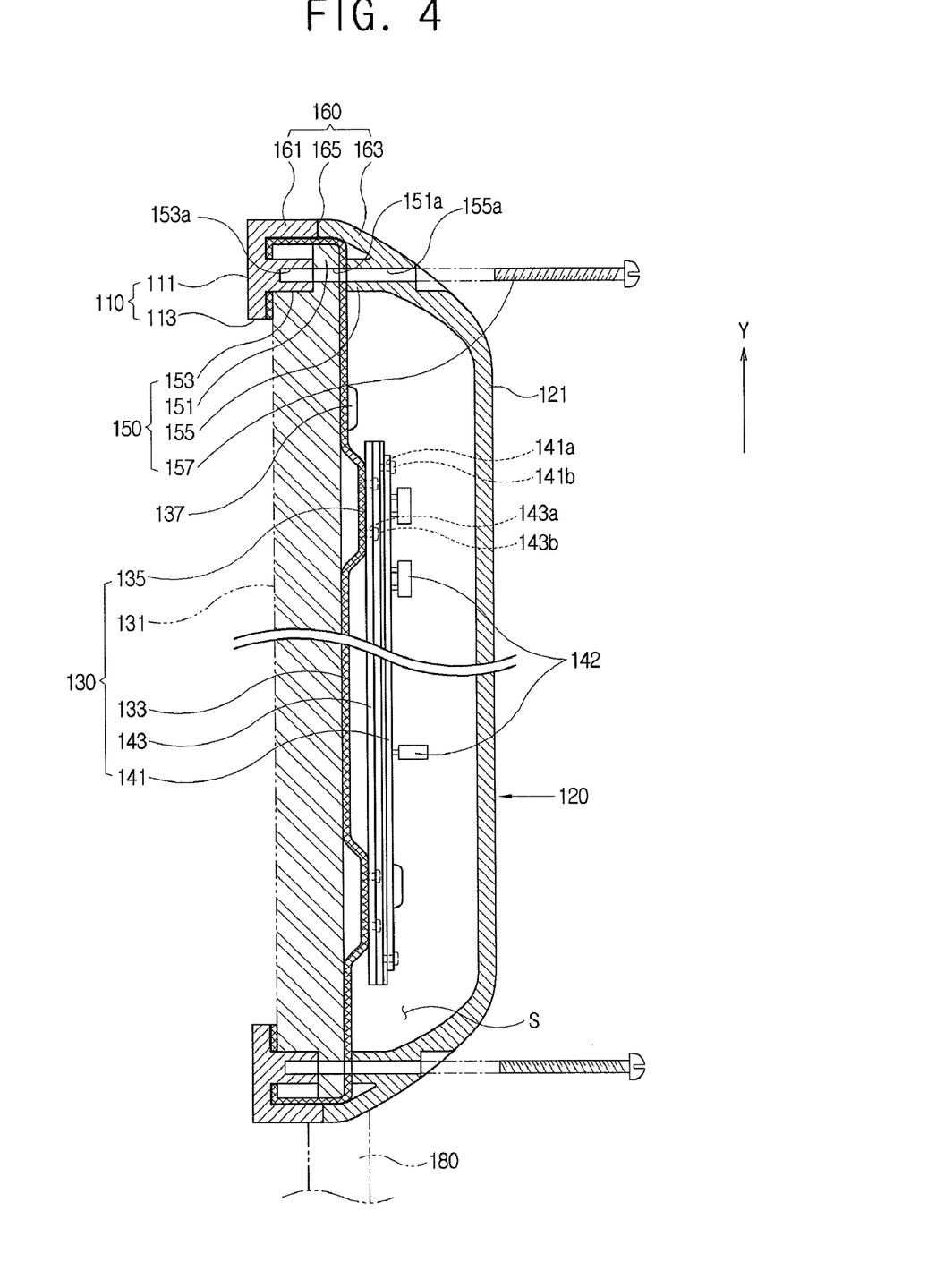
FIG. 4 is a sectional view, taken along line IV-IV in FIG. 3.
Figure 5:
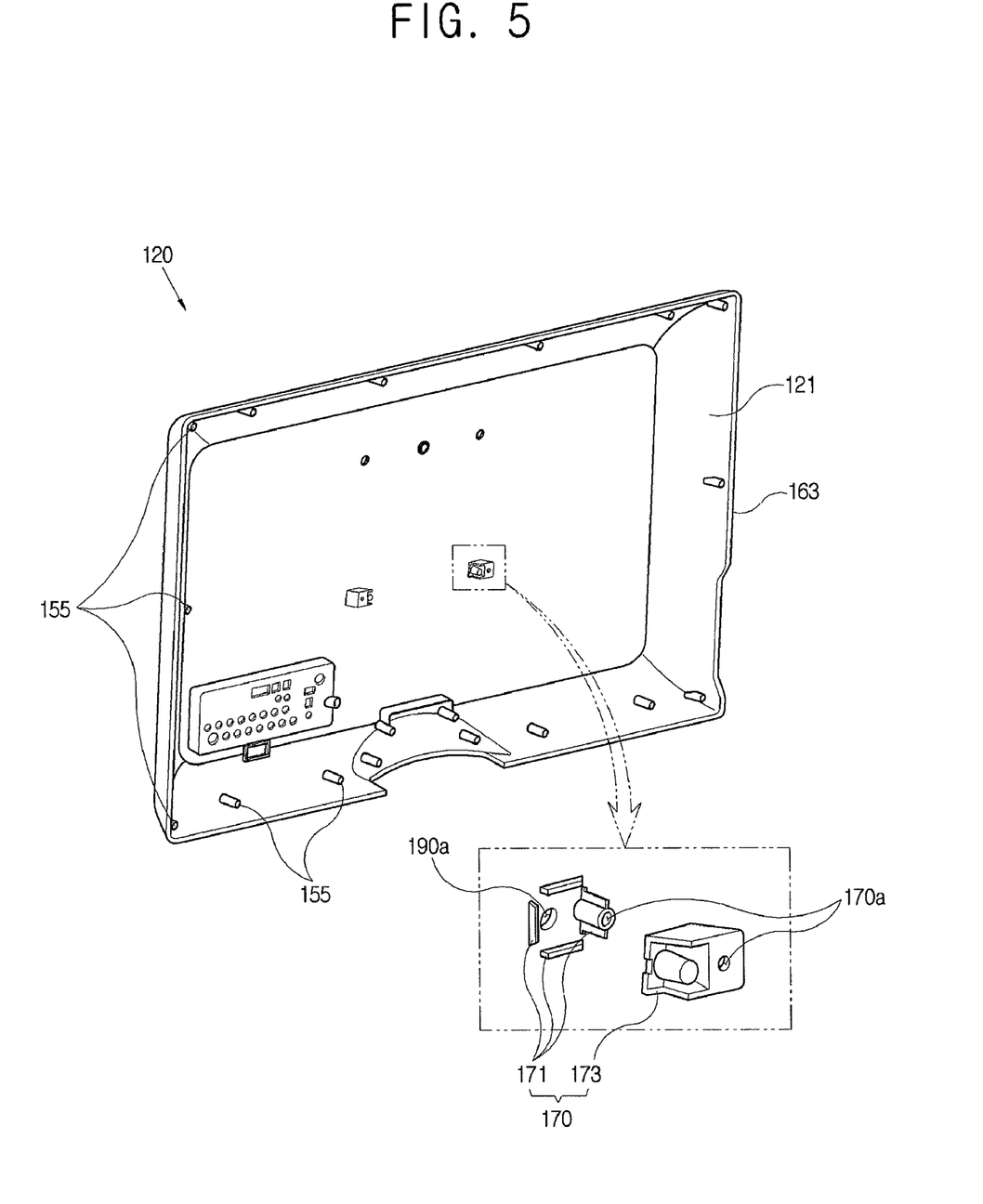
FIG. 5 is an enlarged perspective view of a rear casing in FIG. 2.

A driving supporting bracket 143 combines the driving unit 141 to the first foaming part 135. The driving supporting bracket 143 is combined with the driving unit 141 by the diving unit screw 141b through a hole 141a. Herein, the driving supporting bracket 143 is directly coupled to the first foaming part 135 of the frame 133 and corresponds to various types of the driving unit 141. For example, corresponding to various sizes and functions of the driving unit 141 which is coupled to the driving supporting bracket 143, it is possible to vary the length, width or the like of the driving supporting bracket 143. The driving supporting bracket 143 may have various shapes, such as "L", "⊂" and "T". As shown in FIGS. 3 and 4, the driving supporting bracket 143 is combined in a direction of "Y", but may be combined in a direction of "X" as necessary. Further, the driving unit 141 is directly coupled to the first foaming part 135 without the driving supporting bracket 143 as necessary.

Accordingly, the driving supporting bracket 143 may be easily adapted for changes in its design, such as a size of the driving unit 141 or the like, and manufacturing cost is reduced and a light and compact design can be accomplished by means of an optimal material.

The stand bracket 145 combines the frame 133 and the stand 180. The stand bracket 145 is combined to a lower part of the frame 133. The stand bracket 145 has a structure having a sufficient strength, and has a shape corresponding to the shape of the stand 180, to thereby support the stand 180 stably.

The panel supporting part 151 is formed in one of the panel body 131 and the frame 133, or both of the panel body 131 and the frame 133. In this exemplary embodiment, the panel supporting part 151 is depressed in the panel body 131. Alternatively, the panel supporting part 151 may protrude from the panel body 131 and the frame 133 or may extend from the panel body 131 and the frame 133. A panel combining hole 151a is formed in the panel supporting part 151 so as to be combined with a combining member 157. Herein, in the assembly or combining process of the display panel module 130 to the front casing 110, the panel supporting part 151 engages with the front combining part 153, thereby maintaining the coupling or supporting of the display panel module 130 to the front casing 110. Further, the panel supporting part 151 may position the display panel module 130 corresponding to the front casing 110.

The panel supporting part 151 may take various kinds of shapes corresponding to the front combining part 153. The panel supporting part 151 and the front combining part 153 may be combined with each other by press-fitting. In this case, the edge parts of the panel supporting part 151 and the front combining part 153 may be rounded off to be easily guided in the combining process thereof.

Accordingly, there is no need for an extra supporting part such as a bracket to support the display panel module 130 to the front casing 110. Accordingly, the structure of supporting and combining the display panel module 130 can be optimized with ease, and the number of parts can be reduced.

The front combining part 153 may protrude backward from the planar surface of the front casing body 111. Alternatively, the front combining part 153 may be formed on the planar surface of the front casing body 111 or depressed in the planar surface thereof. Considering an area of the contact with the auxiliary combining part 160 or the contact with the display panel module 130 in the display opening 113, the position, number and size, etc. of the front combining part 153 are determined. A front combining hole 153a is formed to be combined with the combining member 157 in the front combining part 153. The front combining hole 153a may be a screw hole corresponding to the combining member 157 such as a screw.

The rear combining part 155 may protrude toward the accommodating space S from the inner planar surface of the rear casing body 121 corresponding to the front combining part 153. Alternatively, the rear combining part 155 may be formed on the planar surface of the rear casing body 121 or depressed in the planar surface thereof. A rear combining hole 155a is formed to be combined with the combining member 157 in the rear combining part 155.

The combining member 157 combines the front casing 110, the display panel module 130 and the rear casing 120. The combining member 157 includes a screw. Alternatively, the combining member 157 may employ various known combining means such as a pin.

Accordingly, the display panel module 130 is combined to the front casing 110 or the rear casing 120 without an extra supporting bracket.

The auxiliary combining part 160 combines the front casing 110 and the rear casing 120 in contact with each other. The auxiliary combining part 160 includes the front skirt 161 and the rear skirt 163. The front skirt 161 and the rear skirt 163 contact each other in a contact surface 165. The combination of the front skirt 161 and the rear skirt 163 in the auxiliary combining part 160 can be variously modified, for example, a stepped surface contact or a projection and a projection accommodating part, etc. may be used.

The front skirt 161 is extended backward from an edge part of the planar surface of the front casing body 111.

The rear skirt 163 is extended toward the front casing 110 from an edge part of the planar surface of the rear casing body 121.

The contact surface 165 has such a structure as to prevent inflow of foreign substances such as dirts to the accommodating space S.

With this configuration, the front skirt 161 and the rear skirt 163 can be combined with each other without an extra combining means. Accordingly, the front casing 110 and the rear casing 120 can be simply combined each other.

Figure 6:
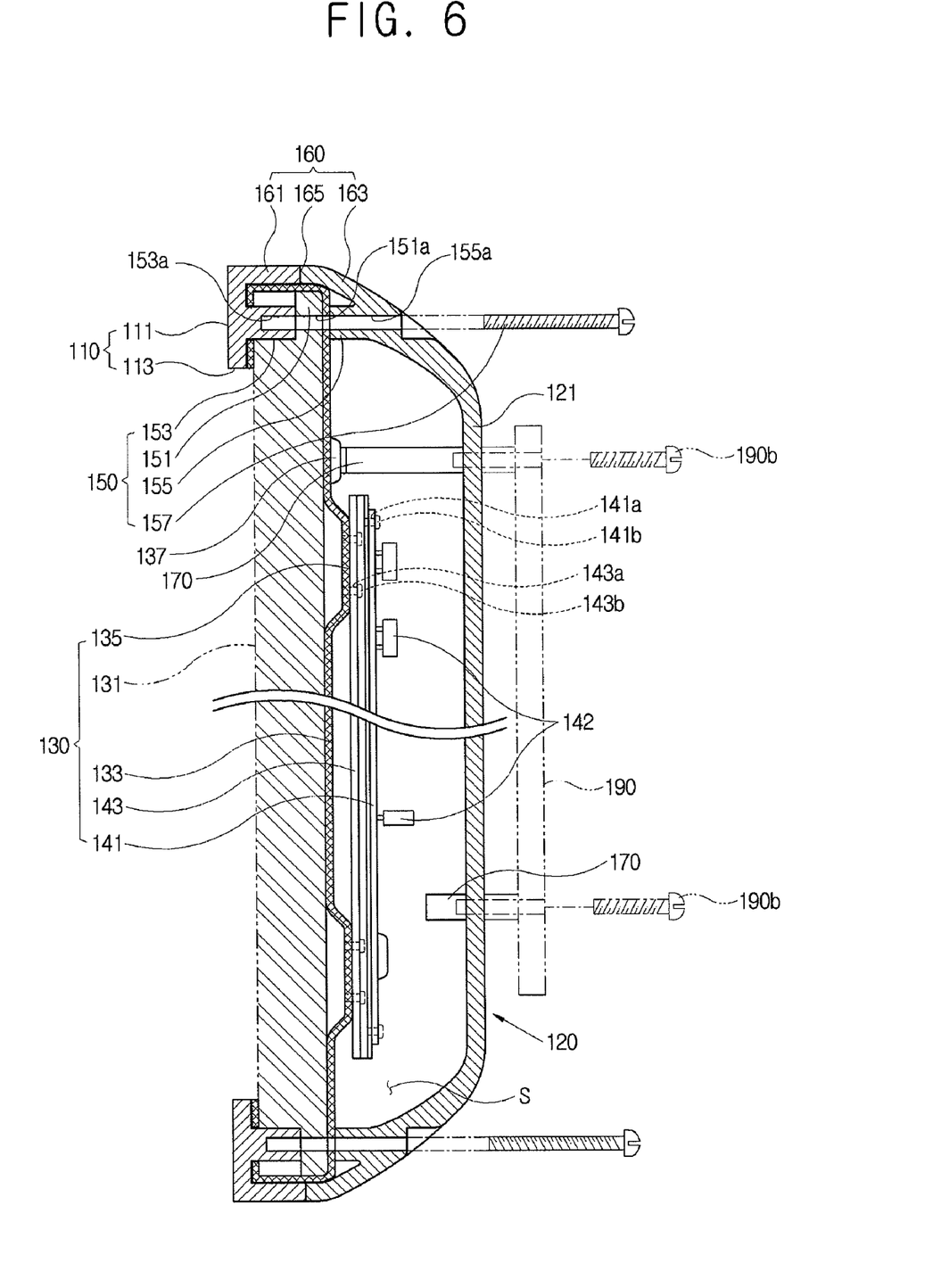
FIG. 6 is a sectional view of a wall supporting bracket in FIG. 4.

When the display apparatus 100 is installed on a wall surface, the wall supporting bracket 170 is combined with a wall bracket 190 and supports the display apparatus 100. The wall supporting bracket 170 can be provided with a variety of structures. For example, the wall supporting bracket 170 is provided with a bending structure which is to be combined with the second foaming part 137 of the frame 133 or a structure which is to be combined with the rear casing 120. As necessary, the wall supporting bracket 170 may be combined to both the second foaming part 137 and the rear casing 120. Referring to FIG. 6, an upper part of the wall bracket 190 is combined with the wall supporting bracket 170 which is combined to the second foaming part 137 of the frame 133 and a lower part of the wall bracket 190 is combined with the wall supporting bracket 170 which is combined to the rear casing 120.

In this case, the wall supporting bracket 170 is provided with a plate shape. In the case that the wall supporting bracket 170 is combined to the second foaming part 137, the wall supporting bracket 170 is provided with a bending shape for connecting a plurality of the second foaming parts 137 with each other. The wall supporting bracket 170 has a through hole 190a which is to be combined with the wall bracket 190 backwards thereof.

In the case that the wall supporting bracket 170 is combined to the rear casing 120, the wall supporting bracket 170 includes a rear projection part 171 and the supporting bracket body 173.

The rear projection part 171 may protrude from the planar surface of the rear casing body 121 and support the supporting bracket body 173. Alternatively, the rear projection part 171 can be variously modified so as to support the supporting bracket body 173. The rear projection part 171 includes a projection combining hole 170a which is to be combined to the supporting bracket body 173.

The supporting bracket body 173 is combined with the rear projection part 171 to be combined with the wall bracket 190. The supporting bracket body 173 has a structure corresponding to the rear projection part 171 so as to be combined with the rear projection part 171. The supporting bracket body 173 includes a through hole (not shown) which is to be combined with the wall bracket 190.

Accordingly, it is relatively simple in structure and small in space in comparison with the case that the supporting bracket body 173 is provided in the rear casing 120 and combined with the second foaming part 137. Further, the interference with the surface mounted elements 142 of the driving unit 141 can be prevented, thereby achieving a slim design.

The stand 180 supports the front casing 110, the display panel module 130 and the rear casing 120. The stand 180 may be omitted when the front casing 110 or the rear casing 120 is installed on an installation surface such as a wall by the wall bracket 190.

The wall bracket 190 supports the front casing 110 or the rear casing 120 on the installation surface such as a wall. The wall bracket 190 is combined with the wall supporting bracket 170 by a screw 190b.

An assembly process of the display apparatus 100 according to the first exemplary embodiment of the present invention will be described below, referring to FIGS. 7A to 7C.

Figure 7A:
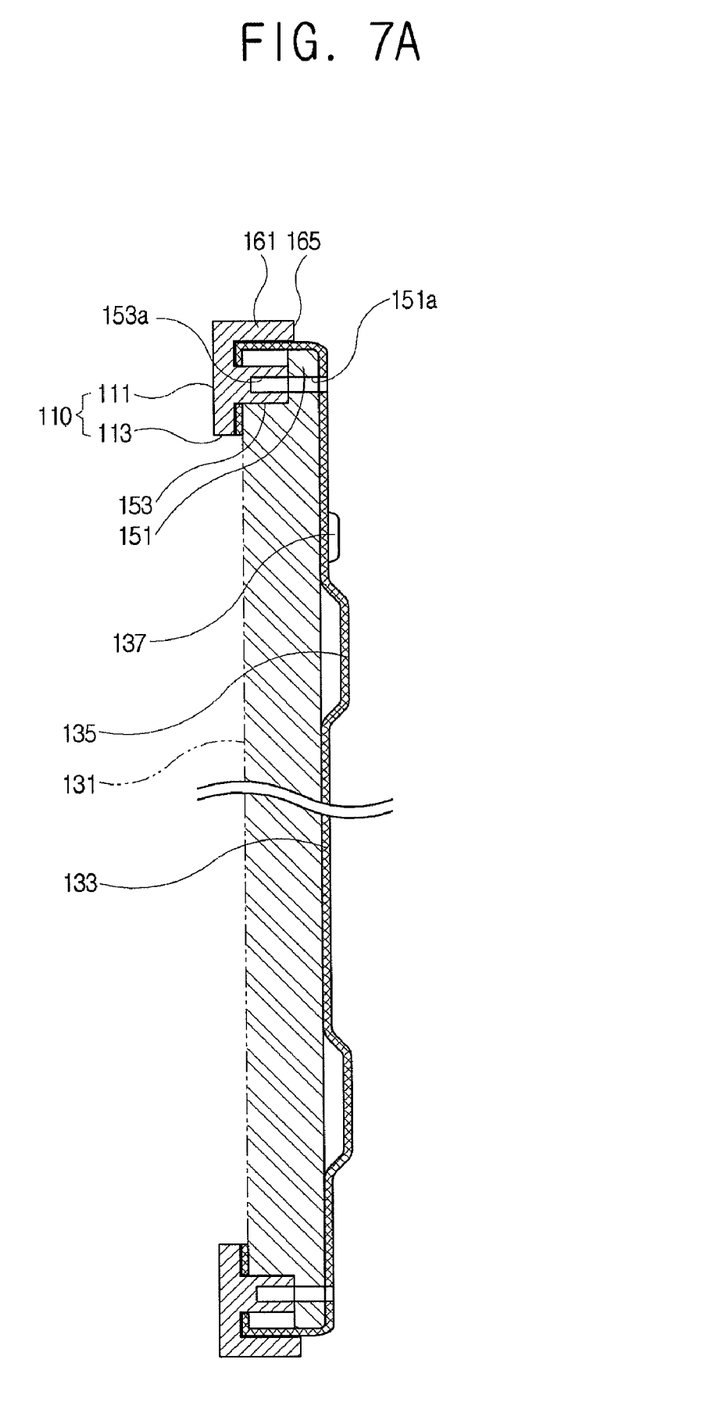
FIGS. 7A to 7C are sectional views illustrating an assembling process for the display apparatus in FIG. 3.

As shown in FIG. 7A, the back of the front casing 110 is aligned so as to face upward in a worktable. Thereafter, the display panel module 130 is fitted in the front casing 110 from backwards. At this time, the front combining part 153 and the panel supporting part 151 are combined with each other.

Figure 7B:
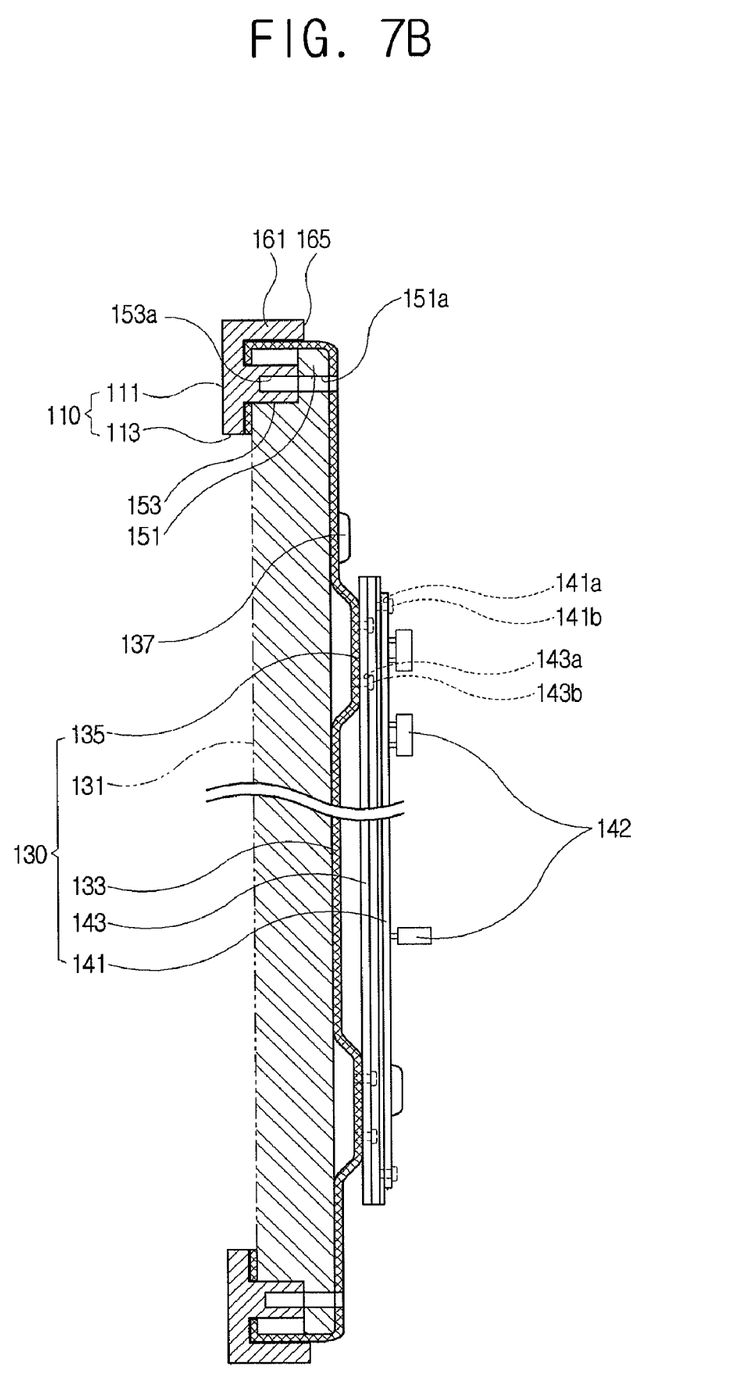

As shown in FIG. 7B, the driving supporting bracket 143 is combined to the first foaming part 135 by means of the bracket screw 143b through the bracket screw hole 143a. Further, the driving unit 141 is combined to the driving supporting bracket 143 by means of the diving unit screw 141b through the hole 141a.

Figure 7C:
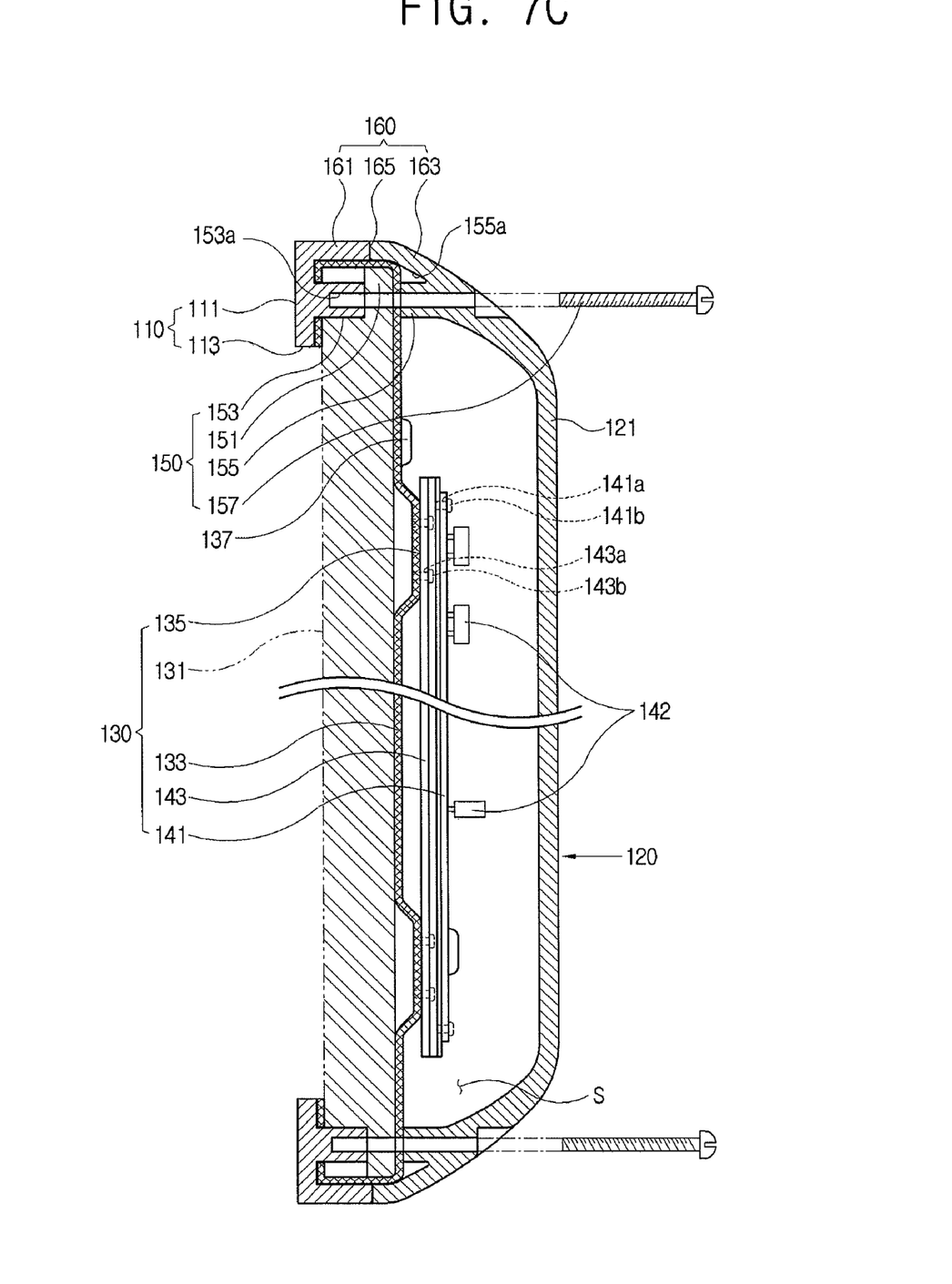

As shown in FIG. 7C, the rear casing 120 is fitted on the rear part of the display panel module 130. At this time, the panel supporting part 151 comes in contact with the rear combining part 155 and the front skirt 161 comes in contact with the rear skirt 163 as well. The plurality of combining members 157 are combined with the front combining holes 153a respectively through the rear combining holes 155a and the panel combining holes 151a. Thus, the front casing 110, the display panel module 130 and the rear casing 120 are firmly combined.

Figure 8:
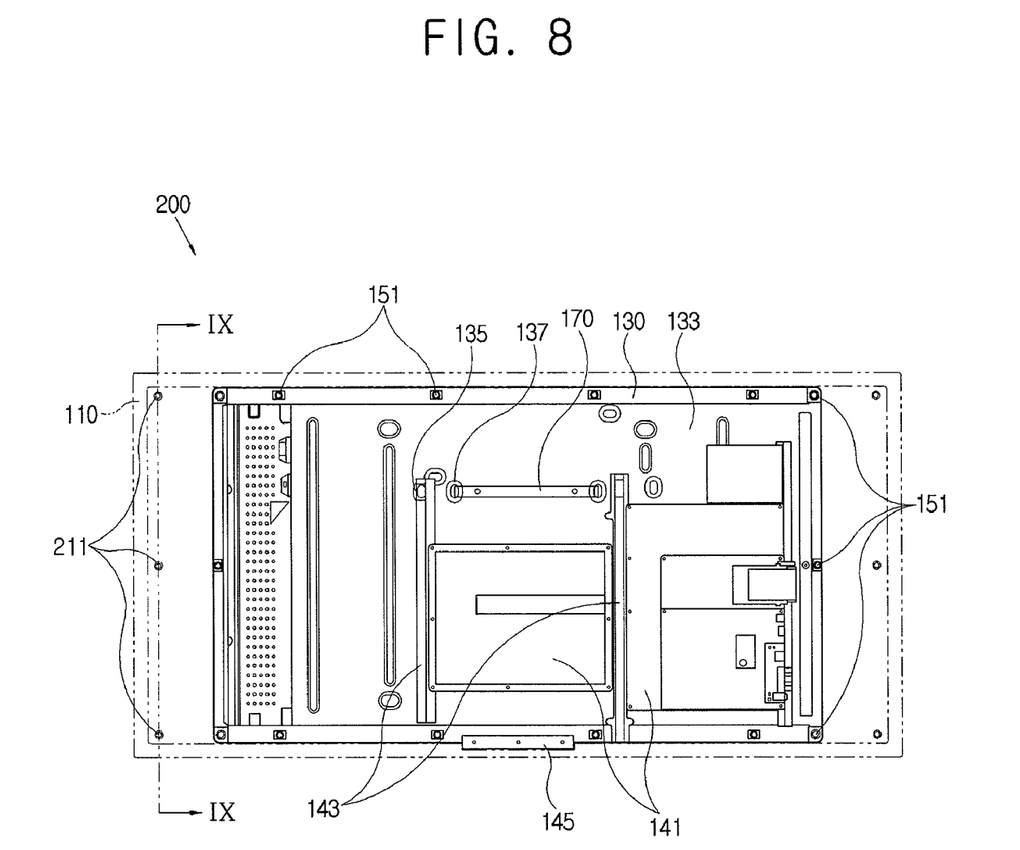
FIG. 8 is a rear view of a display apparatus according to a second exemplary embodiment of the present invention.
Figure 9:
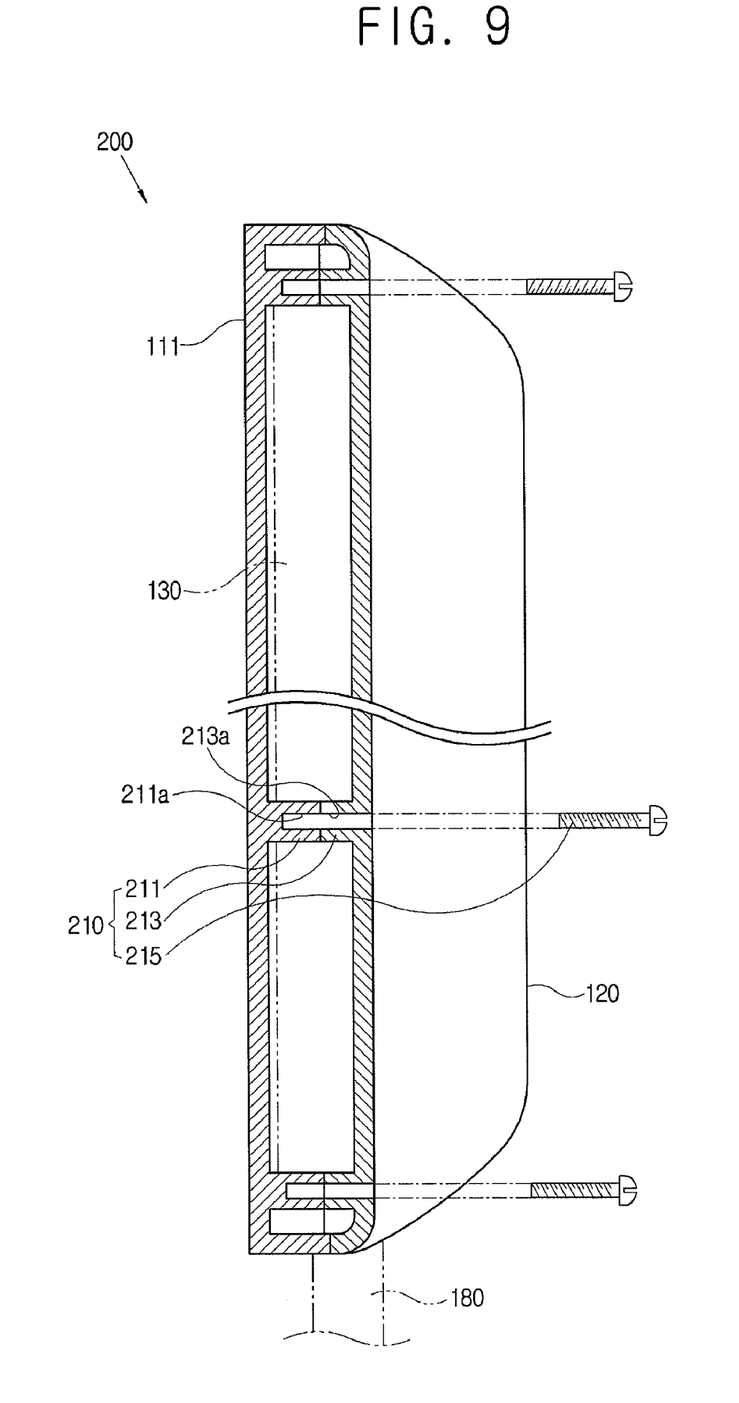
FIG. 9 is a rear view, taken along line IX-IX in FIG. 8.

In FIG. 7C, it is illustrated that the front casing 110, the display panel module 130 and the rear casing 120 are supported by the stand 180, but alternatively, the front casing 110, the display panel module 130 and the rear casing 120 may be supported by the wall bracket 190, as shown in FIG. 6, A Second Exemplary Embodiment A display apparatus 200 according to the second exemplary embodiment of the present invention includes the front casing 110, the rear casing 120, the display panel module 130, the combining part 150 and a direct combining part 210, as shown in FIGS. 8 and 9.

Because the second exemplary embodiment is different from the first exemplary embodiment only in that the second exemplary embodiment further includes the direct combining part 210, the direct combining part 210 is described hereinbelow.

As shown in FIG. 8, right and left sides of the front casing 110 (refer to a dotted line) are provided with a larger width than the width of right and left sides of the display panel module 130. That is, the right and left sides of the front casing 110 are provided with a space, which may be used for installation of an element such as a speaker or beauty of appearance.

While at upper and lower parts of the display apparatus 200 are combined the front casing 110, the display panel module 130 and the rear casing 120, like the first exemplary embodiment, at the right and left sides of the display apparatus 200 are combined the front casing 110 and the rear casing 120 in a different way from the first exemplary embodiment. Alternatively, a bracket may be provided between the front casing 110 and the rear casing 120 to be coupled with the display panel module 130.

As shown in FIG. 9, the direct combining part 210 includes a front boss member 211 and a rear boss member 213. The direct combining part 210 may further include a fastening member 215.

The front boss member 211 is provided plurally at right and left sides of the front casing body 111 and extended backward from the planar surface of the front casing body 111. Alternatively, the front boss member 211 may be formed on the planar surface of the front casing body 111 or may be depressed in the planar surface thereof. Considering an area of the contact with the auxiliary combining part 160 or the contact with the display panel module 130 in the display opening 113, the position, number and size, etc. of the front boss member 211 are determined.

A front boss hole 211a which is to be combined with the fastening member 215 is provided in the front boss member 211. The front boss member 211 may be formed with a screw corresponding to the fastening member 215 such as a screw.

The rear boss member 213 protrudes toward the accommodating space S from the inner planar surface of the rear casing body 121 corresponding to the front boss member 211. Alternatively, the rear boss member 213 may be formed on the planar surface of the rear casing body 121 or may be depressed in the planar surface thereof. A rear boss hole 213a is formed in the rear boss member 213 to be combined with the fastening member 215.

The fastening member 215 passes through the rear boss hole 213a and is combined with the front boss hole 211a to combine the front casing 110 and the rear casing 120. The fastening member 215 includes a screw by way of example, but alternatively, may employ a variety of known fastening means in the art.

With this configuration, the display panel module 130 can be combined to the front casing 110 or the rear casing 120 without an extra supporting bracket, and the front casing 110 and the rear casing 120 can be combined each other. Thus, the structure thereof can be simplified corresponding to various types of the display apparatuses.

As described above, according to the present invention, the number of parts can be reduced and the structure of the apparatus can be simplified. Accordingly, the manufacturing cost and assembling efficiency can be improved.

Further, the present invention can provide a display apparatus having a light and slim design.

Moreover, the present invention can provide a display apparatus which can be easily adapted for a variety of parts.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a front casing which comprises a front casing body which is formed with a display opening and a front combining member;
   a display panel module which comprises a panel body, a frame which is formed on a peripheral area of the panel body and supports the panel body, and a panel supporting member which is formed on the frame and engages the front combining member so that the display panel module is supported by the front combining member of the front casing; and
   a rear casing which comprises a rear casing body and a rear combining member which is provided in correspondence to the front combining member,
   wherein the front combining member, the panel supporting member and the rear combining member are combined by a combining member.

2. The display apparatus according to claim 1, wherein the rear casing forms an accommodating space by being combined with the front casing.

3. A display apparatus comprising:
   a front casing which comprises a front casing body which is formed with a display opening; and
   a display panel module which is combined with the front casing, and which comprises a panel body, a frame which is formed on a peripheral area of the panel body and supports the panel body, and a panel supporting member which is formed on the frame and supported to the front casing,
   wherein the front casing comprises a front combining member which is provided to support the display panel module, and the front combining member and the panel supporting member are engaged with each other so that the display panel module can be supported by the front casing,
   the display apparatus further comprising:
   a rear casing forming an accommodating space by being combined with the front casing, and comprising a rear casing body and a rear combining member which is provided to the rear casing body in correspondence to the front combining member; and
   an auxiliary combining member which comprises a front skirt which is extended from an edge member of the front casing body and a rear skirt which is extended from an edge member of the rear casing body and combined with the front skirt, wherein the end member of the front skirt is combined with the end member of the rear skirt.

4. A display apparatus comprising:
   a front casing which comprises a front casing body which is formed with a display opening; and
   a display panel module which is combined with the front casing, and which comprises a panel body, a frame which is formed on a peripheral area of the panel body and supports the panel body, and a panel supporting member which is formed on the frame and supported to the front casing,
   the display panel module further comprising a rear casing which forms an accommodating space by being combined with the front casing; a first foaming member which is extended backward from the frame; and a driving unit which is combined with the first foaming member and drives the panel body.

5. The display apparatus according to claim 4, wherein the display panel module further comprises a driving unit supporting bracket which combines the first foaming member and the driving unit.

6. The display apparatus according to claim 4, wherein the frame comprises a second foaming member which is spaced from the first foaming member and extended backward thereof, and a wall supporting bracket which is combined to at least one of the second foaming member and the rear casing.

7. The display apparatus according to claim 6, wherein the wall supporting bracket comprises a rear projection member which is extended toward the accommodating space from a planar surface of the rear casing; and a supporting bracket body which is detachably combined to the rear projection member.

8. The display apparatus according to claim 4, further comprising a stand which supports the front casing, the display panel module and the rear casing.

9. The display apparatus according to claim 8, further comprising a stand bracket which is provided to be combined with the frame and the stand.

10. A display apparatus comprising:
    a front casing which comprises a front casing body which is formed with a display opening; and
    a display panel module which is combined with the front casing, and which comprises a panel body, a frame which is formed on a peripheral area of the panel body and supports the panel body, and a panel supporting member which is formed on the frame and supported to the front casing,
    wherein the front casing comprises a front combining member which is provided to support the display panel module, and the front combining member and the panel supporting member are engaged with each other so that the display panel module can be supported by the front casing,
    the display apparatus further comprising:
    a rear casing forming an accommodating space by being combined with the front casing, and comprising a rear casing body and a rear combining member which is provided to the rear casing body in correspondence to the front combining member, and
    a direct combining member comprises a front boss member which is provided to the front casing body and a rear boss member which is provided to the rear casing body so as to be combined with the rear casing body.

11. The display apparatus according to claim 10, wherein the front combining member, the panel supporting member and the rear combining member are combined by a combining member.

12. The display apparatus according to claim 10, wherein the front boss member and the rear boss member are combined by a fastening member.

13. The display apparatus according to claim 10, further comprising an auxiliary combining member which comprises a front skirt which is extended from an edge member of the rear casing body and a rear skirt which is extended from an edge member of the rear casing body and combined with the front skirt, wherein the end member of the front skirt and the end member of the rear skirt are combined.

14. The display apparatus according to claim 10, wherein the display panel module comprises:
a first foaming member which is extended backward from the frame;
a driving unit which is combined to the first foaming member and drives the panel body.

15. The display apparatus according to claim 14, wherein the frame comprises a second foaming member which is spaced from the first foaming member and extended backward from the first foaming member, and a wall supporting bracket which is combined to at least one of the first foaming member and the rear casing.

16. The display apparatus according to claim 15, wherein the wall supporting bracket comprises:

a rear projection member which is extended toward the accommodating space from a planar surface of the rear casing;
a supporting bracket body which is detachably combined to the rear projection member.

17. The display apparatus according to claim 14, further comprising a stand which supports the front casing, the display panel module and the rear casing.

18. The display apparatus according to claim 17, further comprising a stand bracket which is provided to be combined with the frame and the stand.

19. A display apparatus comprising:
a front casing forming a display opening and comprising a front combining part;
a display panel module comprising a panel body and a frame which is formed on a peripheral area of the panel body; and
a rear casing comprising a rear combining part and forming an accommodating space by being combined with the front casing,
wherein a portion of the panel body and a portion of the frame are disposed between the front combing part and the rear combining part, and
wherein a combining member attaches the front combining part and the rear combining part to each other.

20. The display apparatus of claim 19, wherein the combining member extends through the panel body and the frame.

* * * * *